(12) United States Patent
Uehara et al.

(10) Patent No.: US 6,909,881 B2
(45) Date of Patent: Jun. 21, 2005

(54) BASE STATION APPARATUS AND RADIO TRANSMISSION METHOD

(75) Inventors: Toshiyuki Uehara, Yokosuka (JP); Katsuhiko Hiramatsu, Yokosuka (JP); Kenichi Miyoshi, Yokohama (JP); Kazuyuki Miya, Kawasaki (JP); Masayuki Hoshino, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 183 days.

(21) Appl. No.: 10/204,221

(22) PCT Filed: Jan. 18, 2002

(86) PCT No.: PCT/JP02/00329
§ 371 (c)(1),
(2), (4) Date: Aug. 19, 2002

(87) PCT Pub. No.: WO02/058422
PCT Pub. Date: Jul. 25, 2002

(65) Prior Publication Data
US 2003/0096635 A1 May 22, 2003

(30) Foreign Application Priority Data
Jan. 19, 2001 (JP) ........................................ 2001-012451
Feb. 16, 2001 (JP) ........................................ 2001-040413

(51) Int. Cl.[7] .................................................. H04B 1/00
(52) U.S. Cl. .......................................... 455/69; 455/522
(58) Field of Search ................................ 455/69.1, 522, 455/450, 451, 452, 512, 513; 370/335, 342

(56) References Cited

U.S. PATENT DOCUMENTS

| | | |
|---|---|---|
| 4,866,788 A | 9/1989 | Mouly et al. |
| 5,287,384 A | 2/1994 | Avery et al. |
| 5,574,972 A | 11/1996 | Hulbert |

(Continued)

FOREIGN PATENT DOCUMENTS

| | | |
|---|---|---|
| EP | 1239689 | 9/2002 |
| JP | 63187736 | 8/1988 |
| JP | 08023567 | 1/1996 |
| JP | 09172405 | 6/1997 |
| JP | 11215549 | 8/1999 |
| JP | 2000236343 | 8/2000 |
| WO | 9912302 | 11/1999 |

OTHER PUBLICATIONS

O. Gurbuz, et al.; "Dynamic Resource Scheduling for Variable QoS Traffic in W–CDMA", Communications, 1999, ICC '99, 1999 IEEE International Conference on Vancouver, BC, Canada Jun. 6–10, 1999, Piscataway, NJ, USA, IEEE, US, Jun. 6, 1999, pp. 703–707, XP010333609, ISBN: 0–7803–5284–X.

(Continued)

*Primary Examiner*—Lee Nguyen
(74) *Attorney, Agent, or Firm*—Stevens, Davis, Miller & Mosher, LLP

(57) ABSTRACT

A base station transmits downlink signals to mobile terminals of users A to C with respective transmission power corresponding to downlink quality. A downlink quality estimating section (106) uses the transmission power from a transmission power control section to compare transmission power between the users, and estimates that a terminal with low transmission power has high downlink quality. The priorities are determined so that the priority is increased as the transmission power is lower. Thus determined priority information is output to a scheduling section (107). The scheduling section (107) performs scheduling based on the priority information. The section (107) assigns DSCH to terminals in ascending order of transmission power. User A is first assigned DSCH, user B is second assigned DSCH, and user C is third assigned DSCH. It is thus possible to perform scheduling and MCS selection of DSCH with the need of information from a terminal eliminated.

6 Claims, 12 Drawing Sheets

U.S. PATENT DOCUMENTS

| | | | |
|---|---|---|---|
| 5,946,356 | A | 8/1999 | Felix et al. |
| 5,982,760 | A | 11/1999 | Chen |
| 6,005,852 | A | 12/1999 | Kokko et al. |
| 6,038,450 | A | 3/2000 | Brink et al. |
| 6,169,907 | B1 | 1/2001 | Chang et al. |
| 6,216,004 | B1 | 4/2001 | Tiedemann, Jr. et al. |
| 6,374,117 | B1 | 4/2002 | Denkert et al. |
| 2001/0017852 | A1 | 8/2001 | Skoog et al. |
| 2001/0029189 | A1 * | 10/2001 | Mandyam .................... 455/522 |
| 2001/0034233 | A1 | 10/2001 | Tiedemann, Jr. et al. |
| 2002/0010001 | A1 * | 1/2002 | Dahlman et al. ........... 455/522 |
| 2002/0034167 | A1 | 3/2002 | Ozluturk et al. |
| 2002/0075889 | A1 * | 6/2002 | Rong et al. ................. 370/429 |
| 2002/0089950 | A1 | 7/2002 | Sourour et al. |
| 2002/0101832 | A1 | 8/2002 | Chen et al. |
| 2002/0102941 | A1 | 8/2002 | Kuiri et al. |
| 2002/0147015 | A1 | 10/2002 | Hamabe |
| 2002/0154610 | A1 | 10/2002 | Tiedemann, Jr. et al. |

OTHER PUBLICATIONS

O. Gurbuz, et al.; "Dynamic Rsource Scheduling Schemes for W–CDMA Systems", IEEE Communications Magazine, IEEE Service Center, Piscataway, NJ, US, vol. 38, No. 10, Oct. 2000, pp. 80–84, XP000969730, ISSN: 0163–6804.

Y. Lu, et al.; "Unified Power Control Error Correction Coding and Scheduling for a CDMA Downlink System", Proceedings of IEEE Infocom 1996, Conference on Computer Communications, Fifteenth Annual Joint Conference of the IEEE Computer and Communications Societies, Networking the next generation, San Francisco, Mar. 24–28, 1996, Proceedings of Infocom, L, vol. 2 conf. 15, Mar. 24, 1996, pp. 1125–1132, XP010158182, ISBN: 0–8186–7293–5.

International Search Report dated Apr. 30, 2002.

"Draft Liaison Statement On Adjustment Loop For DL Power Drifting", 3G TS 25.214 V3.0.0, Oct. 1999, TSG–RAN Working Group 1 meeting #9, Dresden, Germany, Nov. 30–Dec. 3, 1999, pp. 1–3.

"Common HSDPA System Simulation Assumptions", 3GPP TSG RAN WG1, Meeting #15, Aug. 22–25, 2000, Berlin, Germany, Ericsson, Motorola, Nokia, pp. 1–12.

Japanese Office Action dated Dec. 24, 2002 with English translation.

Supplementary European Search Report dated Dec. 12, 2002.

* cited by examiner

| MCS | TRANSMISSION POWER |
|---|---|
| #n | $Th(n) \leq P$ |
| #n-1 | $Th(n-1) \leq P < Th(n)$ |
| ⋮ | ⋮ |
| #0 | $Th0 \leq P < Th1$ |
| NOT ASSIGNED | $P < Th0$ |

FIG.8

| THE NUMBER OF CONNECTED BASE STATIONS | MARGIN |
|---|---|
| 2 | 3dB |
| 3 | 4.8dB |
| ⋮ | ⋮ |

FIG.12

BASE STATION APPARATUS AND RADIO TRANSMISSION METHOD

TECHNICAL FIELD

The present invention relates to a base station apparatus and radio transmission method used in a digital radio communication system, in particular, in a CDMA (Code Division Multiple Access) system.

BACKGROUND ART

In recent years, introduction of a shared channel such as DSCH (Downlink Shared CHannel) used by a plurality of communication terminals (users) has been studied to transmit a large amount of packet data over the downlink. For example, when transmission is performed using DSCH, on a dedicated channel, each user transmits control data, performs transmission power control and maintains synchronization, while receiving information indicating a transmitted DSCH signal is to the user and information on transmission rate of DSCH signal.

In DSCH transmission, scheduling as to determine users and their priority to transmission data is performed corresponding to the downlink quality. For example, a base station monitors downlink qualities for all the users under control of the base station, and preferentially assigns DSCH to users providing higher quality. A terminal obtains CIR (Carrier to Interference Ratio) based on a CPICH (Common PIlot CHannel) signal, and notifies the base station of the CIR information, whereby the base station is capable of monitoring the downlink quality.

Further, selection of MCS (Modulation and Coding Scheme) is performed corresponding to the downlink quality. Also in this case, a terminal obtains CIR based on a CPICH signal, and notifies the base station of the CIR information, whereby the base station is capable of selecting a scheme.

However, when performing the scheduling and MCS selection based on CIR obtained from a CPICH signal in a terminal, the terminal should notify CIR. It is thus necessary for the terminal to always transmit CIR for the scheduling and MCS selection. Therefore, a problem arises that information to be transmitted using uplink signals is increased.

DISCLOSURE OF INVENTION

It is an object of the present invention to provide a base station apparatus and radio transmission method enabling scheduling and MCS selection of DSCH to be performed with the need of information from a terminal side eliminated.

The object is achieved by performing scheduling and MCS selection of DSCH using transmission power of DPCH or DPCCH that a transmit side is capable of monitoring, and thereby eliminating the need of information from the terminal side in performing the scheduling and MCS selection of DSCH.

BRIEF DESCRIPTION OF DRAWINGS

FIG. 8 is a view showing a table used in MCS selection;

FIG. 12 is a view showing a correspondence table in the base station apparatus according to Embodiment 6 if the present invention.

BEST MODE FOR CARRYING OUT THE INVENTION

Embodiments of the present invention will be described below with reference to accompanying drawings.

A base station apparatus naturally knows transmission power used in transmitting signals to a terminal apparatus communicating with the base station apparatus. The transmission power is of parameter to estimate the downlink quality. In other words, the transmission power is low when the downlink quality is high, while being high when the downlink quality is low. The transmission power is controlled by transmission power control so as to maintain the reception quality at a constant level. The inventor of the present invention noted this point, found out that scheduling and MCS selection of DSCH can be performed with the need of information from a terminal side eliminated by using transmission power of DPCH (Dedicated Physical Channel) in performing the scheduling and MCS selection of DSCH performed with the downlink quality estimated, and carried out the present invention.

That is, it is a gist of the present invention to perform scheduling and MCS selection of DSCH using transmission power of DPCH or DPCCH that a transmit side is capable of monitoring, and thereby eliminates the need of information from a terminal side in performing scheduling and MCS selection of DSCH.

Embodiments of the present invention will be described below specifically with reference to accompanying drawings.

(Embodiment 1)

This embodiment explains a case of performing DSCH scheduling using transmission power of DPCH accompanying DSCH. Specifically, a case will be described that DSCH is preferentially assigned to a user with low DPCH transmission power (high downlink quality).

Figure 1:
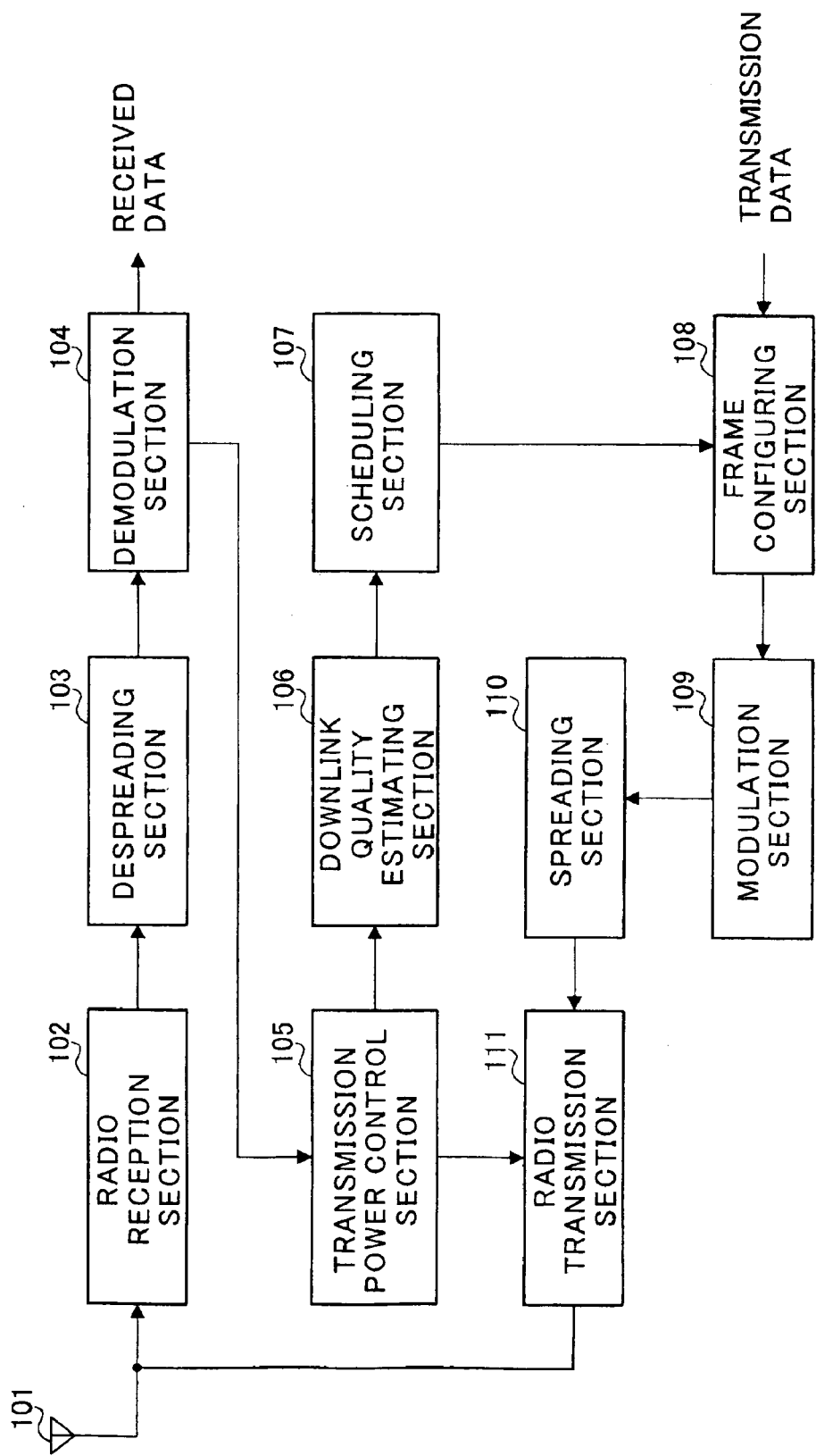
FIG. 1 is a block diagram showing a configuration of a base station apparatus according to Embodiment 1 of the present invention.

FIG. 1 is a block diagram showing a configuration of a base station apparatus according to Embodiment 1 of the present invention. For simplified explanation, FIG. 1 shows a single transmit-section sequence and a single reception-section sequence.

An uplink signal transmitted from a terminal apparatus as a communicating party is received in radio reception section 102 via antenna 101. Radio reception section 102 performs predetermined radio reception processing (for example, downconverting and A/D conversion) on the uplink signal. The signal subjected to the radio reception processing is output to despreading section 103. Despreading section 103 performs despreading on the signal subjected to the radio reception processing using a spreading code used in spreading in the terminal apparatus. The despread signal is output to demodulation section 104.

Demodulation section 104 performs demodulation processing (for example, coherent detection and RAKE combining) on the despread signal, and obtains received data. Further, a TPC command is extracted in the demodulation processing in demodulation section 104. The TPC command is output to transmission power control section 105.

Downlink quality estimating section 106 monitors transmission power for each of all the terminals under control of the base station, assigns priorities to users in ascending order of transmission power, and outputs priority information to scheduling section 107. Based on the priority information from downlink quality estimating section 106, scheduling section 107 performs scheduling to determine users assigned DSCH. The scheduling information determined in scheduling section 107 is output to frame configuring section 108.

Based on the scheduling information, frame configuring section 108 configures a frame using transmission data, and outputs a signal with a frame configuration to modulation section 109. Modulation section 109 performs digital modulation on the signal with the frame configuration, and outputs the modulated signal to spreading section 110.

Spreading section 110 performs spreading on the modulated signal using a spreading code, and outputs the spread signal to radio transmission section 111. Radio transmission section 111 performs predetermined transmission processing (for example, D/A conversion and upconverting) on the spread signal. The signal subjected to the radio transmission processing is transmitted to a terminal apparatus as a downlink signal via antenna 101.

The scheduling operation in the base station apparatus with the above configuration will be described below. Herein, a case will be described that there are three terminal apparatuses, i.e., three users (user A, user B and user C) under control of the base station.

Figure 2:
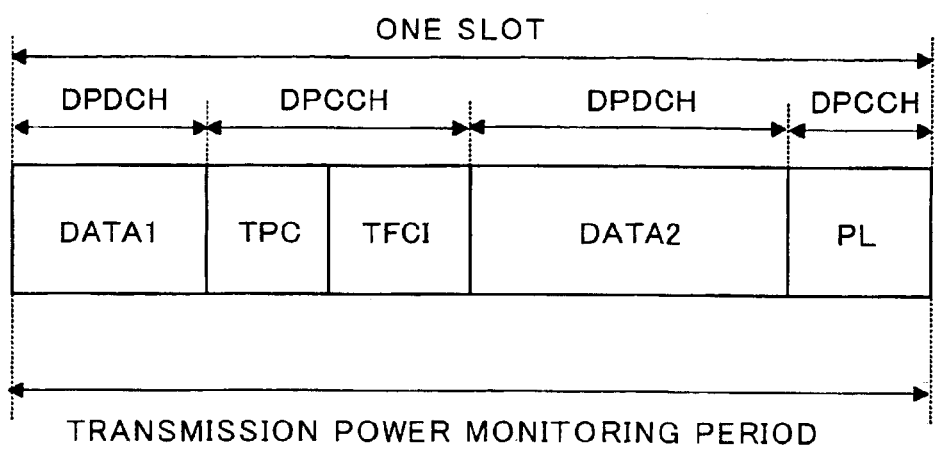
FIG. 2 is a diagram showing a slot configuration of a downlink signal.

The base station (BS) transmits downlink signals to mobile terminals (MS) of users A to C with respective transmission power corresponding to downlink quality. Downlink quality estimating section 106 monitors the transmission power of a slot in transmission power control section 105, compares transmission power between the users, and estimates that a terminal with low transmission power has high downlink quality. Then, the section 106 determines priorities so that the priority is increased as the transmission power is lower. As shown in FIG. 2, with a one-slot period set as a transmission power monitoring period as shown in FIG. 2, the transmission power is obtained by calculating an average value of transmission power of the transmission power monitoring period (DPCCH (Dedicated Physical Control CHannel) and DPDCH (Dedicated Physical Data CHannel)). Thus determined priority information is output to scheduling section 107.

Figure 4:
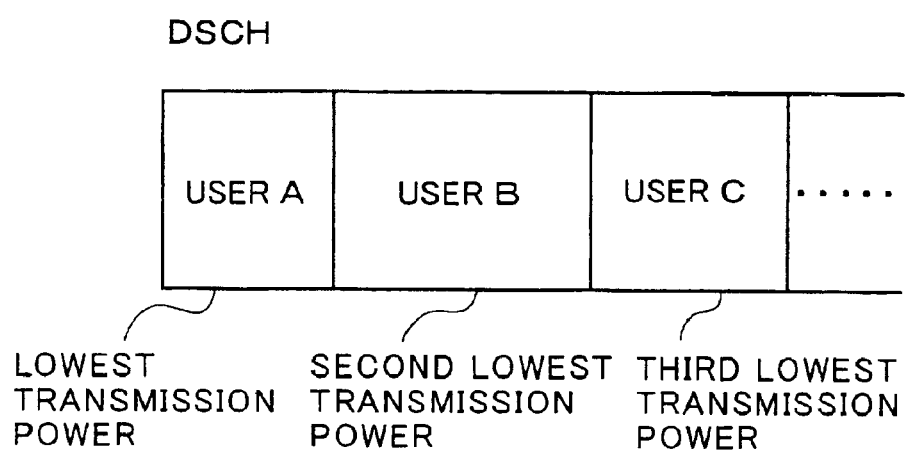
FIG. 4 is a diagram to explain DSCH scheduling.

Scheduling section 107 performs scheduling based on the priority information. In other words, the section 107 assigns DSCH to terminals in ascending order of transmission power (in descending order of downlink quality). Herein, since the transmission power to user A is the lowest, the transmission power to user B is second lowest, and the transmission power to user C is third lowest, it is estimated that the downlink quality is higher in the order of user C to A. Therefore, as shown in FIG. 4, user A is first assigned DSCH, user B is second assigned DSCH, and user C is third assigned DSCH.

In addition, in scheduling it may be possible to assign DSCH to users in another order corresponding to transmission power, instead of assigning starting from a user with low transmission power and high quality. The another order is not limited particularly, and for example, it may be possible to determine the priority using service and data rate.

Figure 3A:
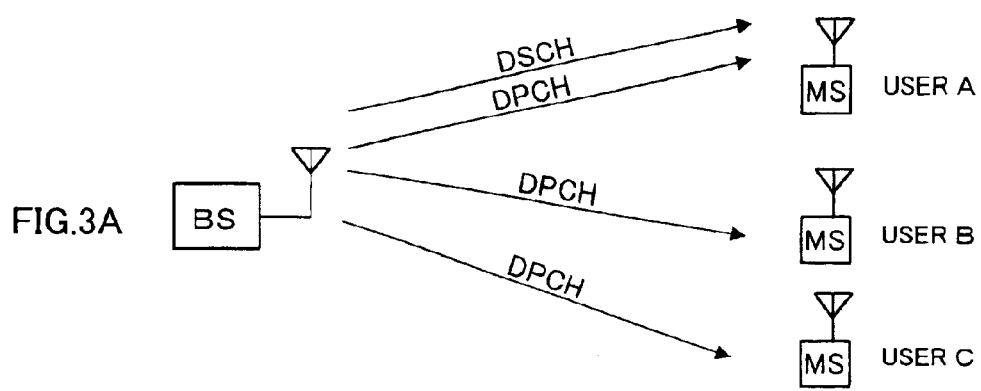
FIG. 3A is a diagram showing a case that a base station transmits signals using DSCH.
Figure 3B:
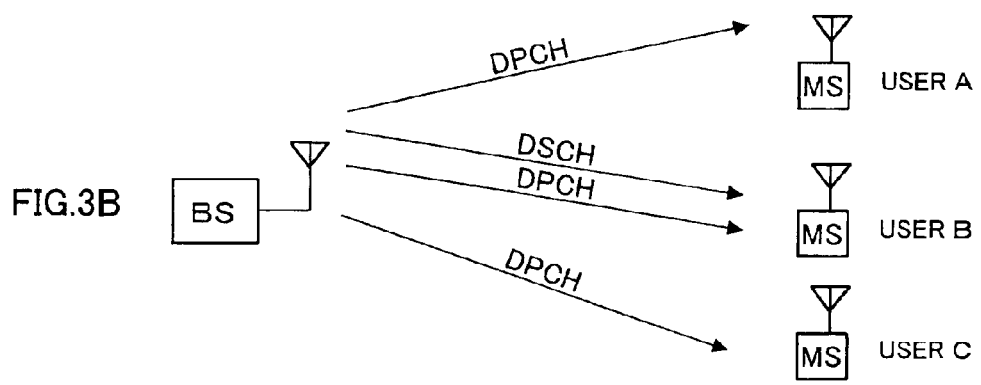
FIG. 3B is another diagram showing a case that a base station transmits signals using DSCH.
Figure 3C:
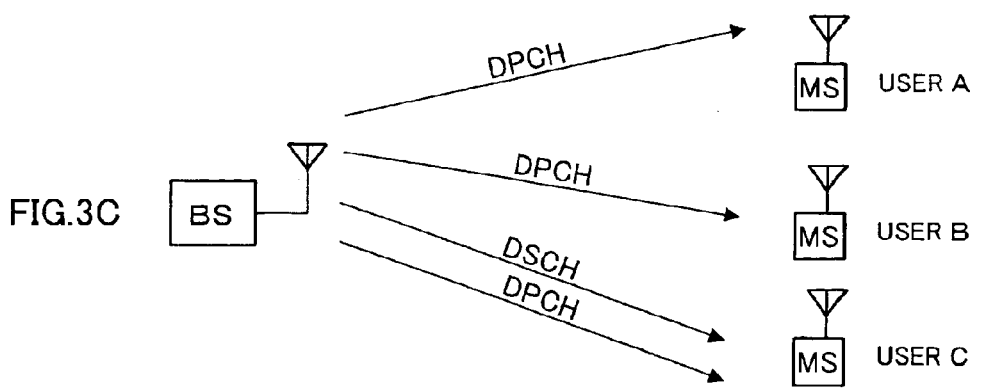
FIG. 3C is another diagram showing a case that a base station transmits signals using DSCH.

Then, according to the scheduling, DSCH signals are transmitted. In other words, as shown in FIG. 3A DSCH signals are first transmitted to user A, next as shown in FIG. 3B, transmitted to user B, and then as shown in FIG. 3C, transmitted to user C. Further, with respect to DSCH transmission, as mentioned above, it may be possible to transmit signals on DSCH separately according to priority or to a plurality of terminals to share.

In DSCH scheduling, when the scheduling is once determined, it may be possible to newly perform scheduling after completing the DSCH transmission according to the scheduling, or to update a result of scheduling for each slot because the transmission power is monitored for each slot. By updating a result of scheduling while monitoring the transmission power of a predetermined period, it is possible to estimate the downlink quality with accuracy even when propagation environments vary due to the effect of fading, and to perform DSCH assignment more suitably.

On DPCH, each of users A to C transmits control data, performs transmission power control, and maintains synchronization, while receiving information indicating a transmitted DSCH signal is to the user and information on transmission rate of the DSCH signal. Then, the terminal receives the DPCH signal to determine whether a DSCH signal is to the terminal, and when the signal is to the terminal, interprets DSCH transmission rate information from the DPCH signal to receive and demodulate signals transmitted on DSCH.

Thus, according to this embodiment, since it is possible to perform DSCH scheduling using transmission power of DPCH that can be monitored at a side of a base station, DSCH scheduling is performed with the need of information from a side of a terminal eliminated.

This embodiment explains the case where downlink quality estimating section 106 determines a priority to each terminal based on transmission power, and based on the determined priority information, scheduling section 107 performs the scheduling. However, it may be possible in this embodiment that downlink quality estimating section 106 monitors transmission power to each terminal, and associates the monitored transmission power with each terminal to output to scheduling section 107, and based on the information, scheduling section 107 performs the scheduling.

(Embodiment 2)

As shown in FIG. 2, on DPCH are timewise multiplexed DPDCH for transmitting data (DATA 1 and DATA 2) and DPCCH for transmitting control data (TPC (Transmission Power control), TFCI (Transport Format Combination Indicator) and PL (Pilot)). The transmission power of DPDCH varies corresponding to data rate, while the transmission power of DPCCH is constant not depending on the data rate. Therefore, when transmission power of a single slot is obtained using DPDCH and DPCCH, it is considered that the transmission power of a single slot differs for each slot due to variations in data rate of DPDCH. In addition, the transmission power of DPDCH and DPCCH is controlled by transmission power control so that the reception quality is constant.

Accordingly, this embodiment explains a case of performing DSCH scheduling using transmission power f DPCCH that is constant independent of data rate.

Figure 5:
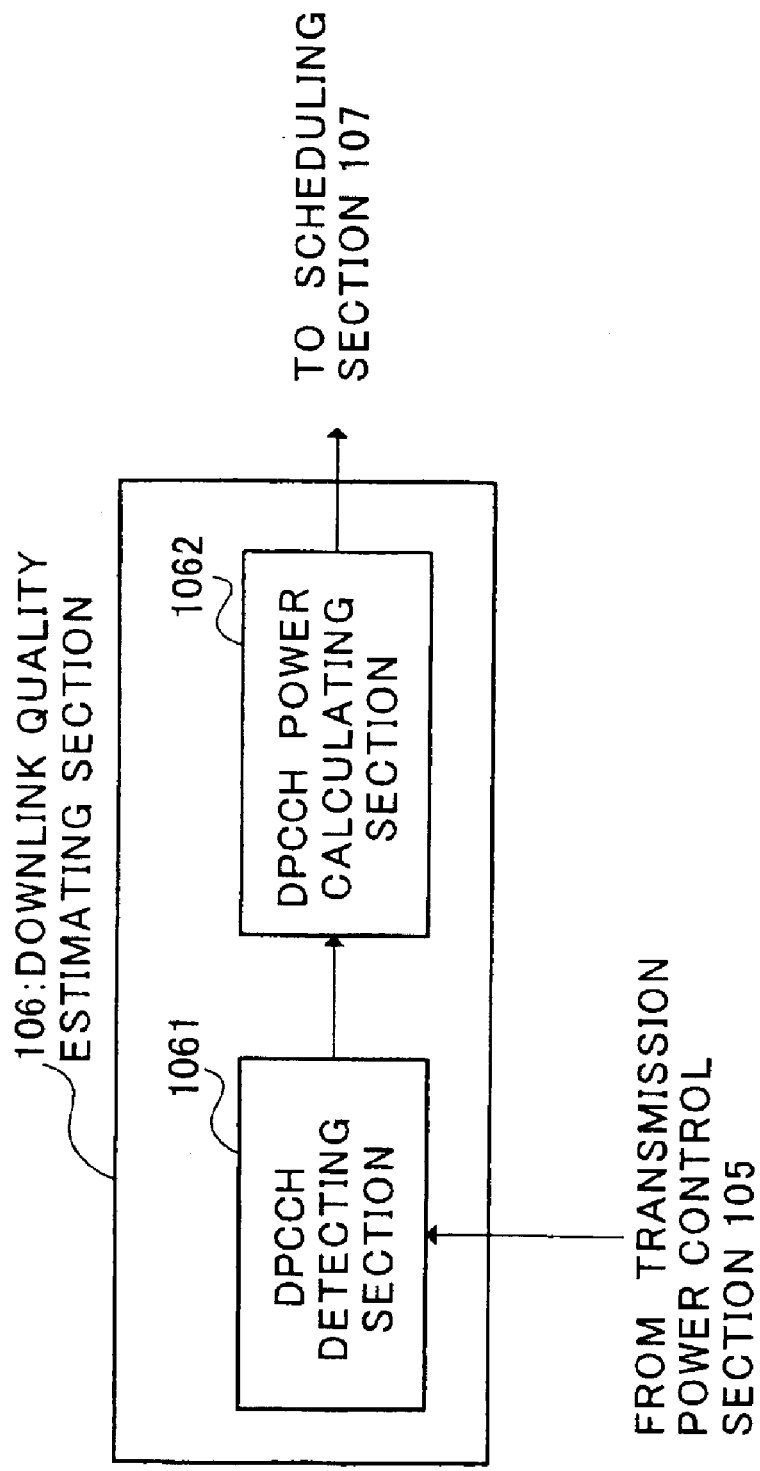
FIG. 5 is a block diagram showing a configuration of a transmission power monitoring section in a base station apparatus according to Embodiment 2 of the present invention.

FIG. 5 is a block diagram showing a configuration of a transmission power monitoring section in a base station apparatus according to Embodiment 2 of the present invention. The other structural sections in the base station apparatus having the transmission power monitoring section shown in FIG. 5 are the same as in the base station apparatus shown in FIG. 1.

Downlink quality estimating section 106 has DPCCH detecting section 1061 that detects a period of DPCCH, and DPCCH power calculating section 1062 that calculates transmission power of a single DPCCH slot detected in DPCCH detecting section 1061.

The scheduling operation in the base station apparatus with the above configuration will be described below. Herein, a case will be described that there are three terminal apparatuses, i.e., three users (user A, user B and user C) under control of the base station.

The base station transmits downlink signals to the terminals of users A to C with respective transmission power corresponding to downlink quality. Downlink quality estimating section 106 monitors the transmission power of a slot in transmission power control section 105, compares the transmission power between the users, and estimates that a terminal with low transmission power has high downlink quality. Then, the section 106 determines priorities so that the priority is increased as the transmission power is lower.

Figure 6:
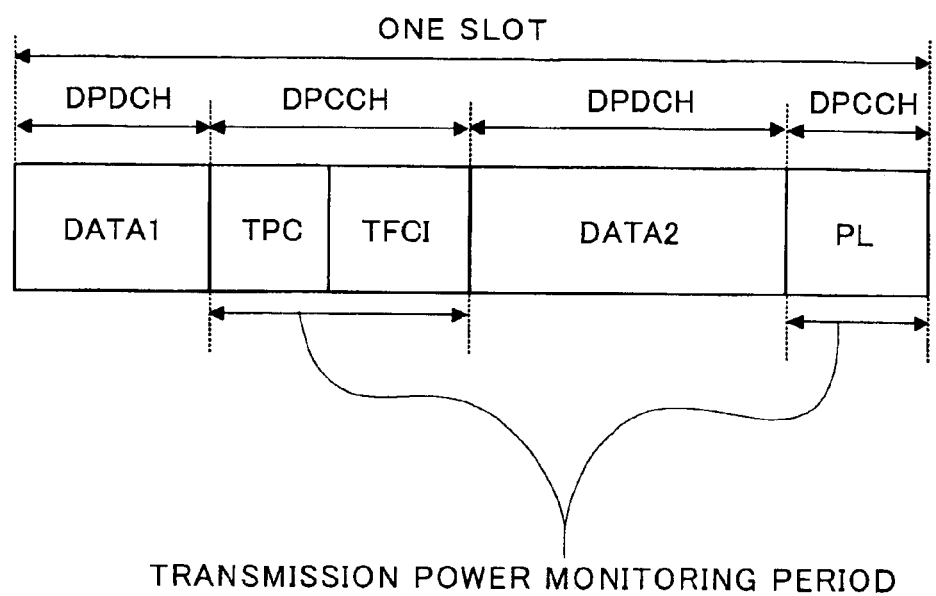
FIG. 6 is a diagram showing a slot configuration of a downlink signal.

Herein, as shown in FIG. 6, a period of DPCCH in one slot is set as a transmission power monitoring period, and the transmission power is obtained from the transmission power of the transmission power monitoring period (DPCCH).

Specifically, DPCCH detecting section 1061 detects the DPCCH period, and outputs the transmission power of the detected DPCCH period for each terminal to DPCCH power calculating section 1062. DPCCH power calculating section 1062 calculates the transmission power of the DPCCH period when necessary, compares the transmission power between the users, and estimates that a terminal with low transmission power has high downlink quality. Then, the section 1062 determines priorities so that the priority is increased as the transmission power is lower. Thus determined priority information is output to scheduling section 107.

In addition, DPCCH power calculating section 1062 executes calculation when necessary, instead of executing general transmission power calculation. For example, a case sometimes happens that the transmission power varies for each symbol when M-ary modulation is used as a modulation scheme, and in such a case, the average transmission power may be calculated. Further, the transmission power is calculated when scheduling section 107 obtains desired parameters using the transmission power in the scheduling.

Scheduling section 107 performs scheduling based on the priority information. In other words, the section 107 assigns DSCH to terminals in ascending order of transmission power (in descending order of downlink quality). Herein, since the transmission power to user A is the lowest, the transmission power to user B is second lowest, and the transmission power to user C is third lowest, it is estimated that the downlink quality is higher in the order of user C to A. Therefore, as shown in FIG. 4, user A is first assigned DSCH, user B is second assigned DSCH, and user C is third assigned DSCH.

In addition, in scheduling it may be possible to assign DSCH to users in another order corresponding to transmission power, instead of assigning starting from a user with low transmission power and high quality. The another order is not limited particularly, and for example, it may be possible to determine the priority using service and data rate.

Then, according to the scheduling, DSCH signals are transmitted. In other words, as shown in FIG. 3A DSCH signals are first transmitted to user A, next as shown in FIG. 3B, transmitted to user B, and then as shown in FIG. 3C, transmitted to user C. Further, with respect to DSCH transmission, as mentioned above, it may be possible to transmit signals on DSCH separately according to priority or to a plurality of terminals to share.

In DSCH scheduling, when the scheduling is once determined, it may be possible to newly perform scheduling after completing the DSCH transmission according to the scheduling, or update a result of scheduling for each slot because the transmission power is monitored for each slot. By updating a result of scheduling while monitoring the transmission power of a predetermined period, it is possible to estimate downlink quality with accuracy even when propagation environments vary due to the effect of fading, and to perform DSCH assignment more suitably.

Thus, according to this embodiment, since it is possible to perform DSCH scheduling using transmission power of DPCCH that can be monitored at a side of a base station, DSCH scheduling is performed with the need of information from a side of a terminal eliminated. Further according to this embodiment, since the scheduling is performed using the transmission power of DPCCH that is constant independent of data rate, it is possible to estimate the downlink quality with more accuracy, and to perform DSCH assignment suitably.

(Embodiment 3)

This embodiment explains a case of performing MCS selection of DSCH using transmission power of DPCH or transmission power of DPCCH accompanying DSCH. Specifically, a case will be described that MCS selection of DSCH is performed corresponding to transmission power level of DPCH.

Figure 7:
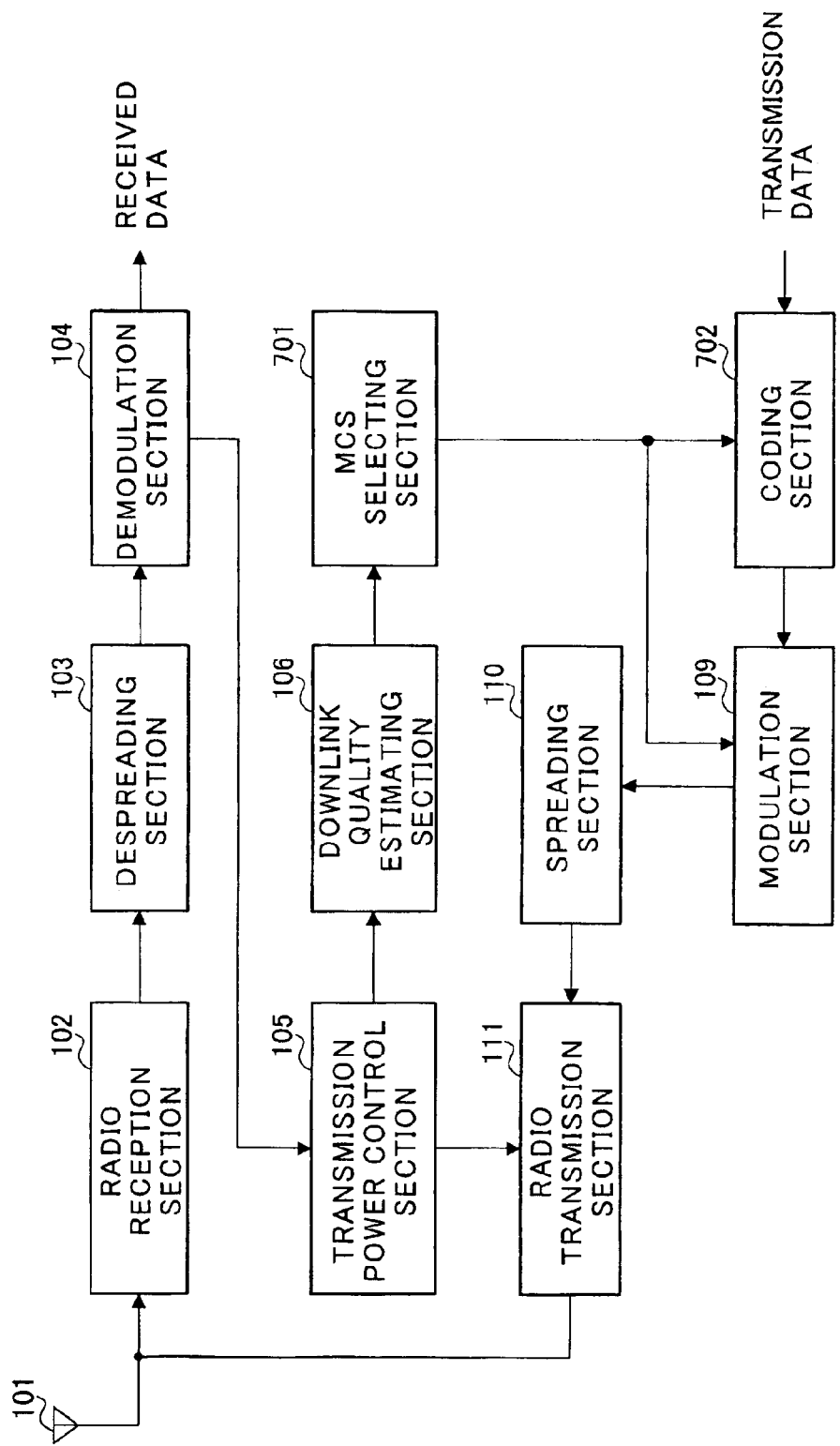
FIG. 7 is a block diagram showing a configuration of a base station apparatus according to Embodiment 3 of the present invention.

FIG. 7 is a block diagram showing a configuration of a base station apparatus according to Embodiment 3 of the present invention. In FIG. 7, the same sections as in FIG. 1 are assigned the same reference numerals as in FIG. 1 to omit specific descriptions thereof.

The base station apparatus shown in FIG. 7 is provided with MCS selecting section 701, instead of scheduling section 107. Downlink quality estimating section 106 monitors transmission power for each of all the terminals under control of the base station, and outputs transmission power levels for each terminal to MCS selecting section 701. Based on the transmission power levels from downlink quality estimating section 106, MCS selecting section 701 performs MCS selection of DSCH. MCS selected in MCS selecting section 701 is outputs to coding section 702 and modulation section 109.

Coding section 702 performs coding on transmission data according to a coding rate of MCS selected in MCS selecting section 701. A coded signal is output to modulation section 109. Modulation section 109 performs digital modulation on the coded signal according to a modulation scheme of MCS selected in MCS selecting section 701, and outputs the modulated signal to spreading section 110.

MCS selecting section 701 selects MCS using the transmission power level output from downlink quality estimating section 106, for example, by comparing the level with a threshold. For example, MCS selecting section 701 compares a transmission power level with thresholds (herein, seven thresholds are provided), and selects MCS referring to a table associating MCS with the transmission power as shown in FIG. 8 with respect to a result of determination with the thresholds. Herein, the MCS number is associated with a range of transmission power level, and when a range of transmission power level is specified by the determination with the thresholds, the MCS number is specified using the table. For the MCS numbers, respective modulation schemes and coding rates are predetermined, and therefore, specifying the MCS number specifies a modulation scheme and coding rate. In addition, as long as MCS is selected corresponding to transmission power, the number of thresholds in the determination and a structure of the table are not limited to the above description.

As described above, MCS is selected for each terminal, and signals are processed according to modulation schemes and coding rates selected for each terminal and assigned to DSCH, thereby performing the downlink transmission. DSCH transmission is the same as in Embodiment 1.

Thus, according to this embodiment, since it is possible to perform MCS selection of DSCH using the transmission power of DPCH that can be monitored at a side of a base station, it is possible to perform MCS selection of DSCH without the need of information from a side of a terminal eliminated.

In addition, as in Embodiment 2, downlink quality estimating section 106 may be composed of DPCCH detecting section 1061 that detects a period of DPCCH, and DPCCH power calculating section 1062 that calculates transmission power of a single DPCCH slot detected in DPCCH detecting section 1061. In other words, as shown in FIG. 6, it may be possible that a period of DPCCH in one slot is set as a transmission power monitoring period, and that the transmission power is obtained from the transmission power of the transmission power monitoring period (DPCCH).

Specifically, DPCCH detecting section 1061 detects the DPCCH period, and outputs the transmission power of the detected DPCCH period for each terminal to DPCCH power calculating section 1062. DPCCH power calculating section 1062 averages the transmission power of the DPCCH period, and outputs the averaged transmission power to MCS selecting section 701.

In this way, since MCS selection of DSCH is performed using the transmission power of DPCCH that is constant independent of data rate, it is possible to estimate the downlink quality with more accuracy, and to perform MCS selection of DSCH suitably.

This embodiment explains the case where MCS selecting section 701 makes a determination with thresholds based on the transmission power from downlink quality estimating section 106 to select MCS. However, it may be possible in this embodiment that downlink quality estimating section 106 monitors transmission power to each terminal, compares the monitored transmission power with a threshold, and outputs the determination result to MCS selecting section 701, and based on the determination result, MCS selecting section 701 selects MCS.

(Embodiment 4)

This embodiment explains a case of performing scheduling and MCS selection of DSCH using transmission power of DPCH accompanying DSCH or transmission power of DPCH. Specifically, a case will be described that MCS selection of DSCH is performed corresponding to transmission power level of DPCH or DPCCH.

Figure 9:
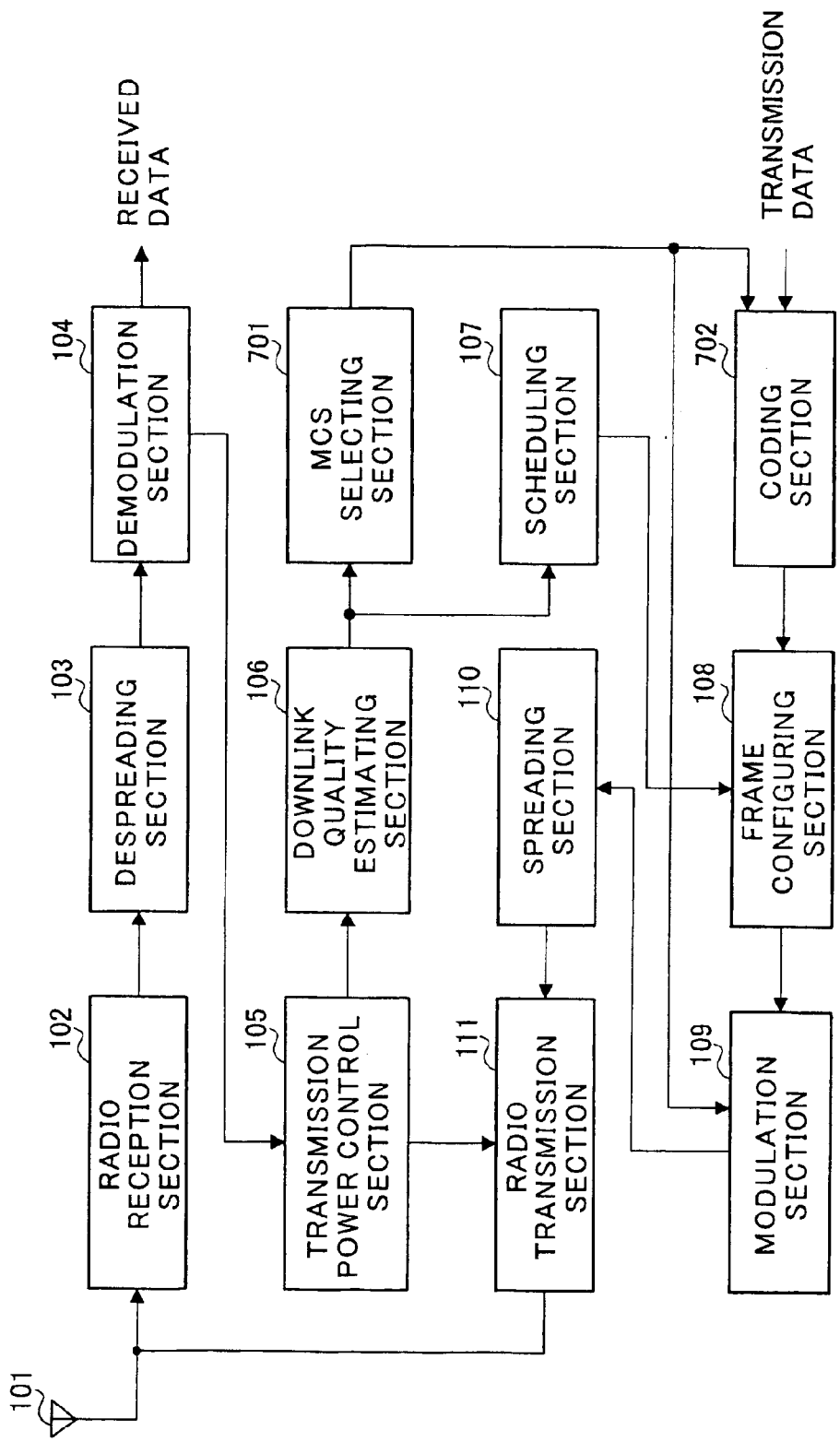
FIG. 9 is a block diagram showing a configuration of a base station apparatus according to Embodiment 4 of the present invention.

FIG. 9 is a block diagram showing a configuration of a base station apparatus according to Embodiment 4 of the present invention. In FIG. 9, the same sections as in FIG. 1 are assigned the same reference numerals as in FIG. 1 to omit specific descriptions thereof.

The base station apparatus shown in FIG. 9 is provided with MCS selecting section 701 in addition to scheduling section 107. Downlink quality estimating section 106 monitors transmission power for each of all the terminals under control of the base station, assigns priorities to users in ascending order of transmission power, and outputs priority information to scheduling section 107. Based on the priority information from downlink quality estimating section 106, scheduling section 107 performs scheduling to determine users assigned DSCH. The scheduling information determined in scheduling section 107 is output to frame configuring section 108.

Based on the scheduling information, frame configuring section 108 configures a frame using transmission data, and outputs a signal with a frame configuration to modulation section 109. Modulation section 109 performs digital modulation on the signal with the frame configuration, and outputs the modulated signal to spreading section 110.

Further, downlink quality estimating section 106 outputs the monitored transmission power levels for each terminal to MCS selecting section 701. Based on the transmission power levels from downlink quality estimating section 106, MCS selecting section 701 performs MCS selection of DSCH. MCS selected in MCS selecting section 701 is output to coding section 702 and modulation section 109.

Coding section 702 performs coding on the transmission data according to a coding rate of MCS selected in MCS selecting section 701. A coded signal is output to modulation section 109. Modulation section 109 performs digital modulation on the coded signal according to a modulation scheme of MCS selected in MCS selecting section 701, and outputs the modulated signal to spreading section 110.

MCS selecting section 701 selects MCS using the transmission power level output from downlink quality estimating section 106, for example, by comparing the level with a threshold. For example, MCS selecting section 701 compares a transmission power level with thresholds (herein, seven thresholds are provided), and selects MCS referring to a table associating MCS with the transmission power as shown in FIG. 8 with respect to a result of determination with the thresholds. Herein, the MCS number is associated with a range of transmission power level, and when a range of transmission power level is specified by the determination with the thresholds, the MCS number is specified using the table. For the MCS numbers, respective modulation schemes and coding rates are predetermined, and therefore, specifying the MCS number specifies a modulation scheme and coding rate. In addition, as long as MCS is selected corresponding to transmission power, the number of thresholds in the determination and a structure of the table are not limited to the above description. Further, it may be possible to calculate using DSP or the like every time instead of using a table.

As described above, the scheduling is performed, MCS is selected for each terminal, and signals are processed according to modulation schemes and coding rates selected for each terminal and assigned to DSCH according to the scheduling, thereby performing the downlink transmission. DSCH transmission is the same as in Embodiment 1.

Thus, according to this embodiment, since it is possible to perform scheduling and MCS selection of DSCH using the transmission power of DPCH that can be monitored at a side of a base station, it is possible to perform scheduling and MCS selection of DSCH with the need of information from a side of a terminal eliminated.

In addition, as in Embodiment 2, downlink quality estimating section 106 may be composed of DPCCH detecting section 1061 that detects a period of DPCCH, and DPCCH power calculating section 1062 that calculates transmission power of a single DPCCH slot detected in DPCCH detecting section 1061. In other words, as shown in FIG. 6, it may be possible that a period of DPCCH in one slot is set as a transmission power monitoring period, and that the transmission power of the transmission power monitoring period (DPCCH) is obtained (averaged when necessary).

Specifically, DPCCH detecting section 1061 detects the DPCCH period. Since the numbers of chips of control data (TPC, TFCI and PL) are predetermined, when a head of a slot is once identified, the transmission power monitoring period can be obtained readily. The section 1061 outputs the transmission power of the detected DPCCH period for each terminal to DPCCH power calculating section 1062. DPCCH power calculating section 1062 calculates the transmission power of the DPCCH period when necessary, compares the transmission power between the users, and estimates that a terminal with low transmission power has high downlink quality. Then, the section 1062 determines priorities so that the priority is increased as the transmission power is lower. Thus determined priority information is output to scheduling section 107. Further, the averaged transmission power is output to MCS selecting section 701.

In addition, in scheduling it may be possible to assign DSCH to users in another order corresponding to transmission power, instead of assigning starting from a user with low transmission power and high quality. The another order is not limited particularly, and for example, it may be possible to determine the priority using service and data rate.

In this way, since MCS selection of DSCH is performed using the transmission power of DPCCH that is constant independent of data rate, it is possible to estimate the downlink quality with more accuracy, and to perform the scheduling and MCS selection of DSCH suitably.

This embodiment explains the case where downlink quality estimating section 106 determines a priority to each terminal based on transmission power, and based on the determined priority information, scheduling section 107 performs the scheduling. However, it maybe possible in this embodiment that downlink quality estimating section 106 monitors transmission power to each terminal, and associates the monitored transmission power with each terminal to output to scheduling section 107, and based on the information, scheduling section 107 performs the scheduling.

This embodiment explains the case where MCS selecting section 701 makes a determination with thresholds based on the transmission power from downlink quality estimating section 106 to select MCS. However, it may be possible in this embodiment that downlink quality estimating section 106 monitors transmission power to each terminal, compares the monitored transmission power with a threshold, and outputs the determination result to MCS selecting section 701, and based on the determination result, MCS selecting section 701 selects MCS.

(Embodiment 5)

During a soft handover, a communication terminal combines signals transmitted from a plurality of base stations, and based on the combined signal, generates a transmission power control bit so as to satisfy required quality, thereby performing transmission power control using the transmission power control bit.

It is assumed that a communication terminal is connected with base station (A), has moved and is connected on DPCH with another base station (B) in soft handover. It is further assumed that the communication quality between the communication terminal and base station (B) is lower than that between the communication terminal and base station (A). In such a state, the TPC bit error tends to occur in transmission between the communication terminal and base station (B).

When the TPC bit error thus occurs, the transmission power in base station (B) differs. Since the transmission power control is performed while combining signals from both base stations during the soft handover, the difference of the transmission power in base station (B) does not affect much. However, in such a state, when the communication quality between the communication terminal and base station (B) becomes higher than that between the communication terminal and base station (A) and the communication terminal starts communicating on DSCH with base station (B), it is not possible to perform scheduling and MCS determination accurately because the transmission power of base station (B) differs.

Then, this embodiment explains a case of performing scheduling and MCS determination on DSCH more accurately based on the transmission power subjected to transmission power adjustment using a technique such as Adjustment Loop performed during a soft handover. In addition, this embodiment explains a configuration for performing both scheduling and MCS determination on DSCH based on the transmission power subjected to transmission power adjustment. However, a configuration may be possible which performs only either scheduling or MCS determination based on the transmission power subjected to transmission power adjustment.

Figure 10:
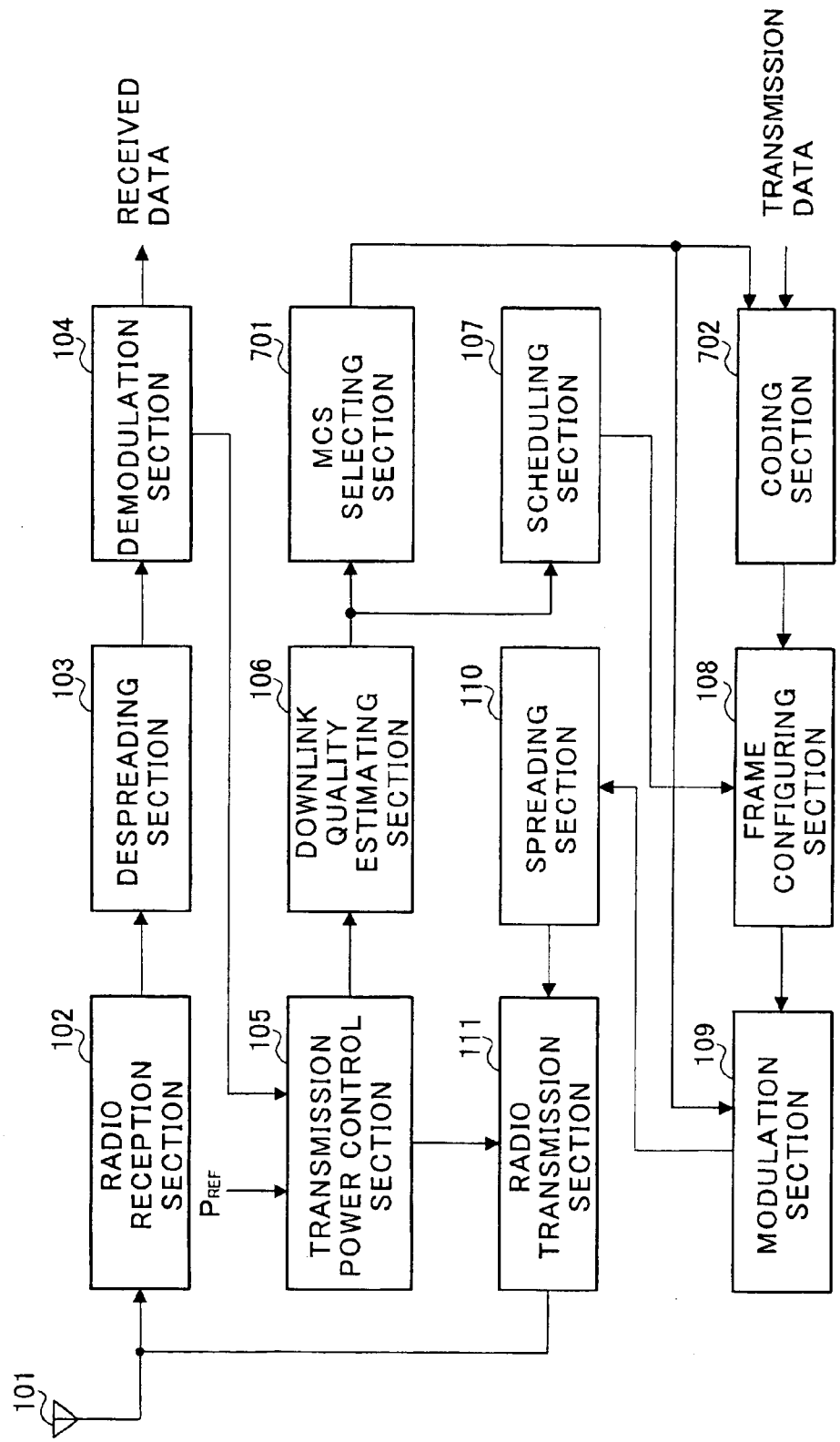
FIG. 10 is a block diagram showing a configuration of a base station apparatus according to Embodiment 5 of the present invention.

FIG. 10 is a block diagram showing a configuration of a base station apparatus according to Embodiment 5 of the present invention. In FIG. 10, the same sections as in FIG. 9 are assigned the same reference numerals as in FIG. 9 to omit specific descriptions thereof.

The base station apparatus shown in FIG. 10 is provided with downlink quality estimating section 106 that estimates the downlink quality using the transmission power of a current control unit calculated in transmission power controlling section 105 using the transmission power of a last control unit, transmission power control information of a last control unit, reference power notified from an upper layer, transmission power balance, etc. The control unit includes a slot or frame per which basis the control is performed.

In the base station apparatus with the above configuration, transmission power control section 105 outputs transmission power control bit of a last control unit to downlink quality estimating section 106. Transmission power control section 105 outputs the transmission power of the last control unit to downlink quality estimating section 106. Further, reference power PREF and transmission power balance Pbalmax is notified (by signaling) to transmission power control section 105 from an upper layer.

Transmission power control section 105 calculates the transmission power of the current control unit with following equations (1) and (2), using the transmission power of the last control unit, transmission power control information of the last control unit, reference power $P_{REF}$, and transmission power balance $P_{balmax}$:

$$P(i+1)=P(i)P_{TPC}(i)+P_{bal}(i) \quad \text{Eq. (1)}$$

$$P_{bal}(i)=\text{sign}\{(1-r)(P_{REF}-P(i))\}\times\min\{|(1-r)(P_{REF}-P(i))|, P_{balmax}\} \quad \text{Eq. (2)}$$

where $P_{REF}$ indicates the reference power, and $P_{balmax}$ indicates a maximum value of transmission power balance Pbal(k).

In equation (1), an increase or decrease in transmission power control is added to the transmission power of the last control unit, and the transmission power balance is increased or decreased, thereby balancing with the reference power. In other words, the transmission power is corrected using PREF and Pbalmax notified by the upper layer signaling.

Transmission power control section 105 corrects transmission power for each of the terminals under control of the base station to calculate, and outputs the corrected transmission power to downlink quality estimating section 106. Downlink quality estimating section 106 assigns priorities to users in ascending order of transmission power, and outputs priority information to scheduling section 107. Based on the priority information from downlink quality estimating section 106, scheduling section 107 performs scheduling to determine users assigned DSCH. The scheduling information determined in scheduling section 107 is output to frame configuring section 108.

Based on the scheduling information, frame configuring section 108 configures a frame using transmission data, and outputs a signal with a frame configuration to modulation section 109. Modulation section 109 performs digital modulation on the signal with the frame configuration, and outputs the modulated signal to spreading section 110.

Further, downlink quality estimating section 106 outputs the transmission power levels for each terminal to MCS selecting section 701. Based on the transmission power levels from downlink quality estimating section 106, MCS selecting section 701 performs MCS selection of DSCH. MCS selected in MCS selecting section 701 is output to coding section 702 and modulation section 109.

Coding section 702 performs coding on the transmission data according to a coding rate of MCS selected in MCS selecting section 701. A coded signal is output to modulation section 109. Modulation section 109 performs digital modulation on the coded signal according to a modulation scheme of MCS selected in MCS selecting section 701, and outputs the modulated signal to spreading section 110. MCS selecting section 701 selects MCS using the transmission power level output from downlink quality estimating section 106, for example, by comparing the level with a threshold as in Embodiments 3 and 4.

As described above, the scheduling is performed, MCS is selected for each terminal, and signals are processed according to modulation schemes and coding rates selected for each terminal and assigned to DSCH according to the scheduling, thereby performing the downlink transmission. DSCH transmission is the same as in Embodiment 1.

Thus, according to this embodiment, it is possible to control the transmission power while compensating for a difference, occurring during a soft handover, of the transmission power of downlink signals from each base station and preventing the difference from increasing. Since the scheduling and MCS selection of DSCH is performed using thus controlled transmission power, it is possible to perform scheduling and MCS selection of DSCH with accuracy.

In addition, as in Embodiment 2, downlink quality estimating section 106 may be composed of DPCCH detecting section 1061 that detects a period of DPCCH, and DPCCH power calculating section 1062 that calculates transmission power of a single DPCCH slot detected in DPCCH detecting section 1061. In other words, as shown in FIG. 6, it may be possible that a period of DPCCH in one slot is set as a transmission power monitoring period, and that the transmission power of the transmission power monitoring period (DPCCH) is obtained (averaged when necessary).

Specifically, DPCCH detecting section 1061 detects the DPCCH period. Since the numbers of chips of control data (TPC, TFCI and PL) are predetermined, when a head of a slot is once identified, the transmission power monitoring period can be obtained readily. The section 1061 outputs the transmission power of the detected DPCCH period for each terminal to DPCCH power calculating section 1062. DPCCH power calculating section 1062 calculates the transmission power of the DPCCH period when necessary, compares the transmission power between the users, and estimates that a terminal with low transmission power has high downlink quality. Then, the section 1062 determines priorities so that the priority is increased as the transmission power is lower. Thus determined priority information is output to scheduling section 107. Further, the averaged transmission power is output to MCS selecting section 701.

In addition, in scheduling it may be possible to assign DSCH to users in another order corresponding to transmission power, instead of assigning starting from a user with low transmission power and high quality. The another order is not limited particularly, and for example, it may be possible to determine the priority using service and data rate.

In this way, since MCS selection of DSCH is performed using the transmission power of DPCCH that is constant independent of data rate, it is possible to estimate the downlink quality with more accuracy, and to perform scheduling and MCS selection of DSCH suitably.

This embodiment explains the case where downlink quality estimating section 106 determines a priority to each terminal based on transmission power, and based on the determined priority information, scheduling section 107 performs the scheduling. However, it maybe possible in this embodiment that downlink quality estimating section 106 estimates the downlink quality of each terminal, and outputs the estimated information for each terminal to scheduling section 107, and based on the information, scheduling section 107 performs the scheduling.

This embodiment explains the case where MCS selecting section 701 makes a determination with thresholds based on the transmission power from downlink quality estimating section 106 to select MCS. However, it may be possible in this embodiment that downlink quality estimating section 106 calculates transmission power to each terminal, compares the calculated transmission power with a threshold, and outputs the determination result to MCS selecting section 701, and based on the determination result, MCS selecting section 701 selects MCS.

In addition, the calculation in downlink quality estimating section 106 is not limited to the case of using reference power as described above. A method may be possible of correcting the transmission power based on the information notified by upper layer signaling or from a communication terminal.

(Embodiment 6)

During a soft handover, a communication terminal receives signals transmitted from a plurality of base stations to combine, and based on the combined signal, generates a transmission power control bit so as to satisfy required quality, thereby performing transmission power control using the transmission power control bit.

Accordingly, during a soft handover, the required quality is satisfied from signals transmitted from a plurality of base stations. In such a state, when performing scheduling and MCS determination on DSCH based on the transmission power from only one base station, it is not possible to accurately perform scheduling and MCS determination on DSCH.

Then, this embodiment explains a case where during a soft handover, the upper layer signaling includes the number of connected base stations, the downlink quality is estimated using the transmission power and margin corresponding to the number, and based on the estimated result, the scheduling and MCS determination on DSCH is performed.

Figure 11:
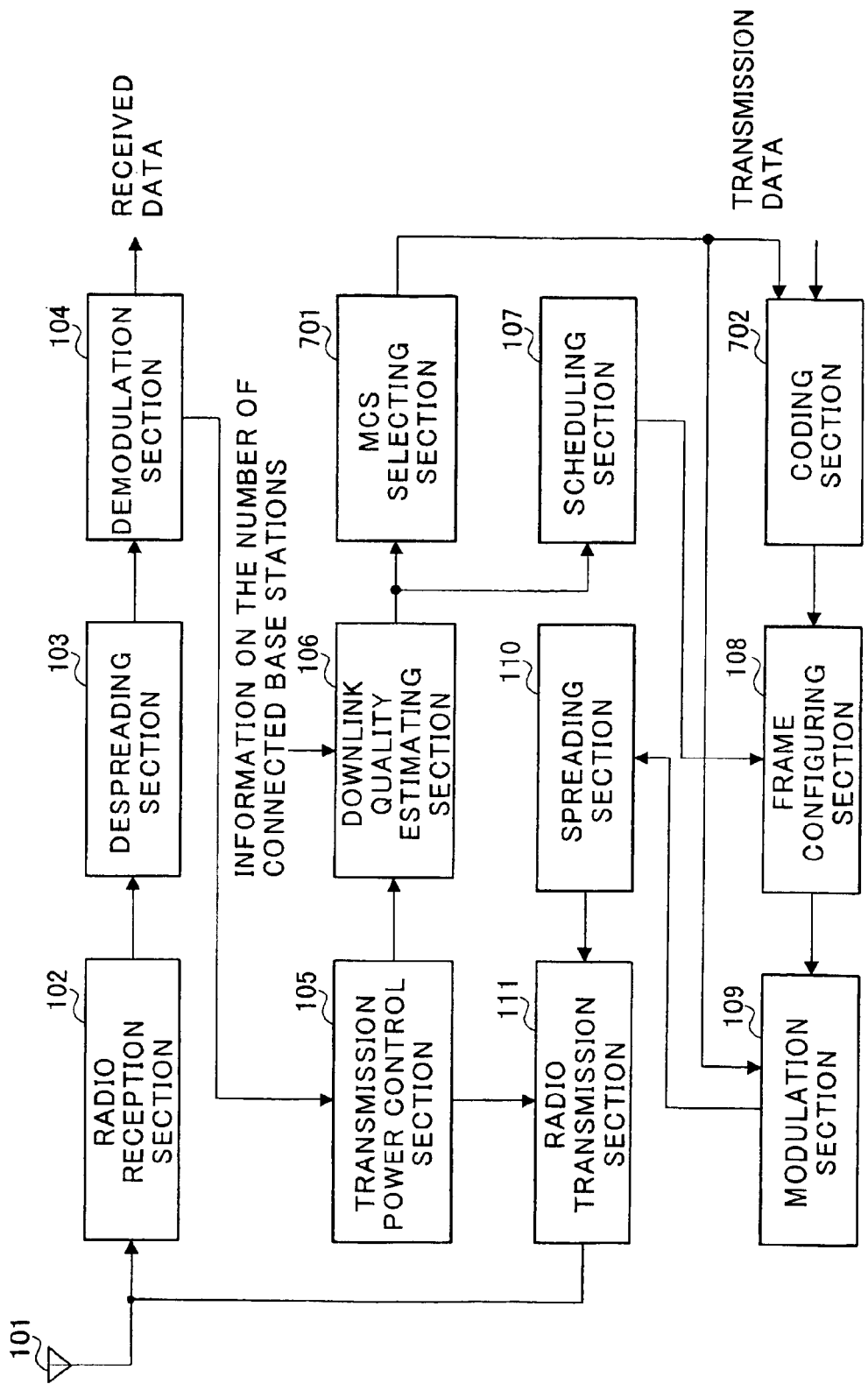
FIG. 11 is a block diagram showing a configuration of a base station apparatus according to Embodiment 6 of the present invention.

FIG. 11 is a block diagram showing a configuration of a base station apparatus according to Embodiment 6 of the present invention. In FIG. 11, the same sections as in FIG. 9 are assigned the same reference numerals as in FIG. 9 to omit specific descriptions thereof.

The base station apparatus shown in FIG. 11 is provided with downlink quality estimating section 106 that calculates transmission power of a current control unit using the information on the number of connected base stations notified from an upper layer. The control unit includes a slot or frame per which basis the control is performed.

In the base station apparatus with the above configuration, the information on the number of connected base stations is notified to downlink quality estimating section 106 from an upper layer (by signaling). Downlink quality estimating section 106 calculates transmission power to estimate the downlink quality (or downlink quality (for example, CIR) estimated using the transmission power) using the margin corresponding to the number of connected base stations. The margin is obtained referring to a correspondence table shown in FIG. 12. The information targeted for the upper layer signaling is not limited to the information on the number of connected base stations, as long as the information enables a base station that transmits DSCH signals to recognize (estimate) a degree of contribution of the base station to the received quality on the combined DPCH signal.

For example, when there are two connected base stations, downlink quality estimating section 106 calculates the transmission power corresponding to the margin of 3 dB referring to the correspondence table in FIG. 12. In other words, since there are two connected base stations, the base station assumes that the required quality is satisfied in a communication terminal by transmission power twice that of the base station, and as a margin, adds 3 dB corresponding to twice the transmission power, and estimates the downlink quality. Then, based on the estimated result, the base station performs the scheduling and MCS determination on DSCH.

Further, when there are three connected base stations, downlink quality estimating section 106 calculates the transmission power corresponding to the margin of 4.8 dB referring to the correspondence table in FIG. 12. In other words, since there are three connected base stations, the base station assumes that the required quality is satisfied in a communication terminal by transmission power three times that of the base station, and as a margin, adds 4.8 dB corresponding to three times the transmission power, and calculates the transmission power. Then, based on the transmission power, the base station performs the scheduling and MCS determination on DSCH.

Downlink quality estimating section 106 estimates the downlink quality for each of all the terminals under control of the base station, assigns priorities to users in ascending order of transmission power, and outputs priority information to scheduling section 107. Based on the priority information from downlink quality estimating section 106, scheduling section 107 performs scheduling to determine users assigned DSCH. The scheduling information determined in scheduling section 107 is output to frame configuring section 108.

Based on the scheduling information, frame configuring section 108 configures a frame using transmission data, and outputs a signal with a frame configuration to modulation section 109. Modulation section 109 performs digital modulation on the signal with the frame configuration, and outputs the modulated signal to spreading section 110.

Further, downlink quality estimating section 106 outputs the transmission power levels for each terminal to MCS selecting section 701. Based on the transmission power levels from downlink quality estimating section 106, MCS selecting section 701 performs MCS selection of DSCH. MCS selected in MCS selecting section 701 is output to coding section 702 and modulation section 109.

Coding section 702 performs coding on the transmission data according to a coding rate of MCS selected in MCS selecting section 701. A coded signal is output to modulation section 109. Modulation section 109 performs digital modulation on the coded signal according to a modulation scheme of MCS selected in MCS selecting section 701, and outputs the modulated signal to spreading section 110. MCS selecting section 701 selects MCS using the transmission power level output from downlink quality estimating section 106, for example, by comparing the level with a threshold as in Embodiments 3 and 4.

As described above, the scheduling is performed, MCS is selected for each terminal, and signals are processed according to modulation schemes and coding rates selected for each terminal and assigned to DSCH according to the scheduling, thereby performing the downlink transmission. DSCH transmission is the same as in Embodiment 1.

Thus, according to this embodiment, the transmission power is controlled with the number of connected base stations considered in a during handover. Since the scheduling and MCS selection of DSCH is performed using thus calculated transmission power, it is possible to perform scheduling and MCS selection of DSCH with accuracy.

In addition, as in Embodiment 2, downlink quality estimating section 106 may be composed of DPCCH detecting section 1061 that detects a period of DPCCH, and DPCCH power calculating section 1062 that calculates transmission power of a single DPCCH slot detected in DPCCH detecting section 1061. In other words, as shown in FIG. 6, it may be possible that a period of DPCCH in one slot is set as a transmission power monitoring period, and that the transmission power of the transmission power monitoring period (DPCCH) is obtained (averaged when necessary).

Specifically, DPCCH detecting section 1061 detects the DPCCH period. Since the numbers of chips of control data (TPC, TFCI and PL) are predetermined, when a head of a slot is once identified, the transmission power monitoring period can be obtained readily. The section 1061 outputs the transmission power of the detected DPCCH period for each terminal to DPCCH power calculating section 1062. DPCCH power calculating section 1062 calculates the transmission power of the DPCCH period when necessary, compares the transmission power between the users, and estimates that a terminal with low transmission power has high downlink quality. Then, the section 1062 determines priorities so that the priority is increased as the transmission power is lower. Thus determined priority information is output to scheduling section 107. Further, the averaged transmission power is output to MCS selecting section 701.

In addition, in scheduling it may be possible to assign DSCH to users in another order corresponding to transmission power, instead of assigning starting from a user with low transmission power and high quality. The another order is not limited particularly, and for example, it may be possible to determine the priority using service and data rate.

In this way, since MCS selection of DSCH is performed using the transmission power of DPCCH that is constant independent of data rate, it is possible to estimate the downlink quality with more accuracy, and to perform scheduling and MCS selection of DSCH suitably.

This embodiment explains the case where downlink quality estimating section 106 determines a priority to each terminal based on transmission power, and based on the determined priority information, scheduling section 107 performs the scheduling. However, it may be possible in this embodiment that downlink quality estimating section 106 calculates transmission power to each terminal, and associates the calculated transmission power with each terminal to output to scheduling section 107, and based on the information, scheduling section 107 performs the scheduling.

This embodiment explains the case where MCS selecting section 701 makes a determination with thresholds based on the transmission power from downlink quality estimating section 106 to select MCS. However, it may be possible in this embodiment that downlink quality estimating section 106 calculates transmission power to each terminal, compares the calculated transmission power with a threshold, and outputs the determination result to MCS selecting section 701, and based on the determination result, MCS selecting section 701 selects MCS.

In addition, the method of calculating a margin with the number of connected base stations considered is not limited to the above case, and is capable of being carried out with various modifications thereof. Further, values of margin are not limited to this embodiment.

Moreover, while this embodiment explains the case of using the information on the number of connected base stations notified by the upper layer signaling, in the present invention the information on the number of connected base stations may be obtained from a terminal apparatus. The information to calculate the margin is not limited to information on the number of connected base stations, as long as the information enables the margin to be calculated. Examples of the information include a ratio of power of a base station that transmit DSCH signals to power of all the base stations to be connected on DPCH.

Above-mentioned embodiments 1 to 6 are capable of being carried into practice in a combination thereof as appropriate.

The present invention is not limited to the above-mentioned embodiments, and is capable of being carried into practice with various modifications thereof. For example, each of the above-mentioned embodiments explains the case of performing scheduling and MCS selection of DSCH using the transmission power of DPCH or DPCCH. However, the present invention is applicable to a case of performing scheduling and MCS selection of DSCH using the transmission power of a dedicated channel besides DPCH.

Each of the above-mentioned embodiments explains the case of three users with which the base station communicates. However, the present invention is similarly applicable to a case of three or more users.

While each of the above-mentioned embodiments explains the case of using transmission power of a slot for scheduling and MCS selection of DSCH, the present invention is similarly applicable to a case of using transmission power of a period longer than a slot for scheduling and MCS selection of DSCH.

Each of the above-mentioned embodiments explains the case of performing scheduling and MCS selection of DSCH using the transmission power of DPCH or DPCCH. However, in the present invention it may be possible to execute processing other than the scheduling and MCS selection using the transmission power of DPCH or DPCCH as long as the processing is executed while estimating the downlink quality.

While each of above-mentioned embodiments explains the case of performing scheduling and MCS determination using the transmission power, in the present invention it may be possible to perform the scheduling and MCS determination using the downlink quality (for example, CIR) estimated using the transmission power. Also in such a case, it is possible to obtain the same effect as in the present invention.

Each of above-mentioned embodiments explains the case of performing scheduling and MCS selection using only the transmission power. However, in the present invention it may be possible to perform scheduling and MCS determination using both the transmission power and information (for example, CIR information or quality information indicative of a transmission rate judged to enable the reception) transmitted from a terminal. It is thereby possible to increase the reliability of the scheduling and MCS determination. Further, it is possible to apply to determining the number of codes and/or coding rate associated with the transmission rate and transmission power.

As is apparent from the foregoing, the base station apparatus and radio transmission method of the present invention are capable of performing scheduling and MCS selection of DSCH using transmission power of DPCH or DPCCH that can be monitored at a transmitting side, whereby it is possible to performing scheduling and MCS selection of DSCH with the need of information from a terminal side eliminated.

This application is based on the Japanese Patent Applications No.2001-012451 filed on Jan. 19, 2001, and No.2001-040413 filed on Feb. 16, 2001, entire contents of which are expressly incorporated by reference herein.

INDUSTRIAL APPLICABILITY

The present invention is suitable for use in a digital radio communication system, particularly, in a CDMA system.

What is claimed is:

1. A base station apparatus comprising:
    a selection section that selects a coding rate and a modulation scheme of a DSCH (downlink shared channel) based on transmission power of a downlink DPCH (dedicated physical channel) associated with the DSCH.

2. The base station apparatus according to claim 1, further comprising:
    a coding section that codes a signal using the coding rate selected by said selection section; and
    a modulation section that modulates the signal using the modulation scheme selected by said selection section.

3. The base station apparatus according to claim 2, further comprising:
    a transmission section that transmits the signal coded by said coding section and modulated by said modulation section DSCH.

4. The base station apparatus according to claim 1,
wherein the DSCH is shared by a plurality of communication terminals and the downlink DPCH is for each of the plurality of communication terminals.

5. A communication system comprising:

a base station; and a communication terminal, wherein the base station selects a coding rate and a modulation scheme of a DSCH (downlink shared channel) based on transmission power of a downlink DPCH (dedicated physical channel) associated with the DSCH, and wherein the communication terminal receives a signal, which is coded using the coding rate selected by the base station and modulated using the modulation scheme selected by the base station, on the DSCH.

6. A radio transmission method in a base station, comprising:

selecting a coding rate and a modulation scheme of a DSCH (downlink shared channel) based on transmission power of a downlink DPCH (dedicated physical channel) associated with the downlink DSCH.

* * * * *